Figure 1:
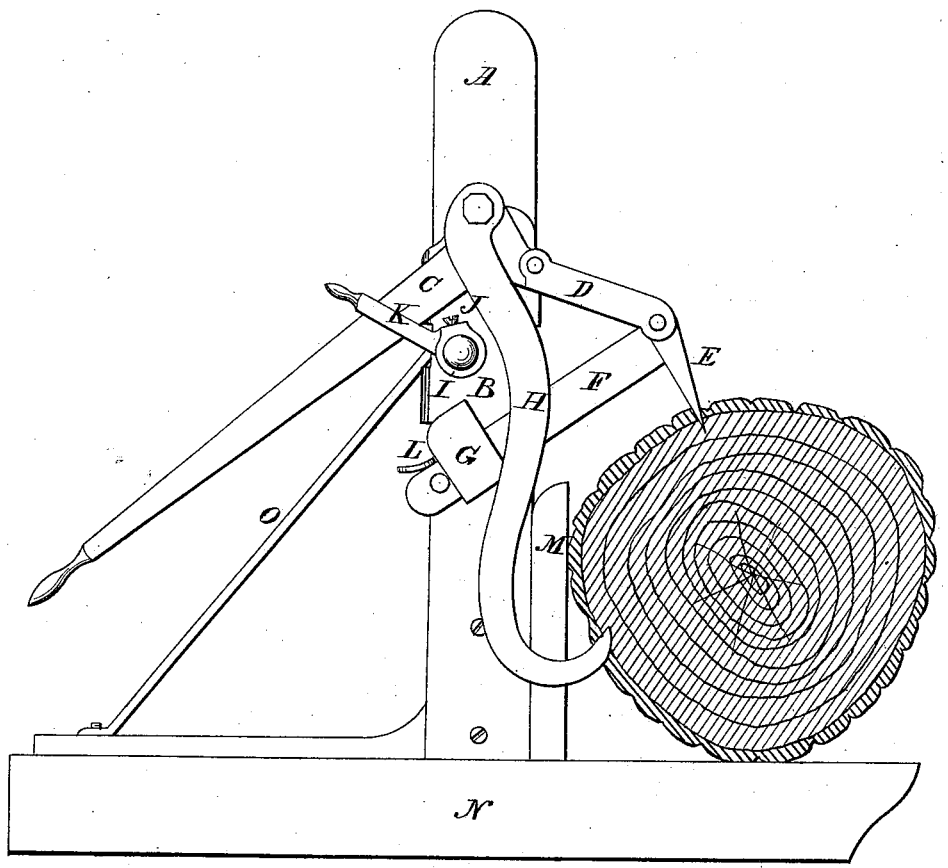

C. J. LEACH.
Saw-Mill Dog.

No. 199,213. Patented Jan. 15, 1878.

Attest:
Levi S. Warren
John S. Heald

Inventor:
Charles J. Leach

UNITED STATES PATENT OFFICE.

CHARLES J. LEACH, OF HARTFORD TOWNSHIP, VAN BUREN COUNTY, MICH.

IMPROVEMENT IN SAW-MILL DOGS.

Specification forming part of Letters Patent No. 199,213, dated January 15, 1878; application filed November 3, 1877.

*To all whom it may concern:*

Be it known that I, CHARLES J. LEACH, of Hartford, in the county of Van Buren and State of Michigan, have invented certain new and useful Improvements in Saw-Mill Dogs; and I do hereby declare that the following is a full, clear, and exact description thereof, which will enable others skilled in the art to which it appertains to make and use the same, reference being had to the accompanying drawings, and to letters of reference marked thereon, which form a part of this specification; the object being to construct the same so as to enable the sawyer to readily secure the log for sawing to the carriage, and also to secure the cant in such a manner that it can be sawed up to the last inch board without readjusting the dog.

Figure 1 is a perspective view of my invention.

In the drawing, A represents a standard, which sustains the working parts of my device, and which should be bolted securely to the side of the knee of the carriage. B represents a slide, on which the working parts of my device are elevated. C is a lever, fastened to slide B by means of a stud and nut, which forces the dog E to penetrate the timber by the connection D. F is a bar, which, being held firmly by the swivel G, enables the dog to bind the log firmly to the knee of the carriage. H is a hook suspended to the end of the lever C, which will gripe or release the under side of the log or cant, at the will of the operator, and also relieves a part of the friction of the log on the block, which is increased by dogs which dog on the top only. I is a set-screw to hold the dog while elevated, and which forms a handle for the purpose of handling the machine. J is a smaller set-screw, which enables the operator to adjust the lever K to the position most convenient to the operator. L represents a spring-catch, which enables the operator to instantly adjust the dog for the cant.

What I claim as my invention, and desire to secure by Letters Patent, is—

The combination of the lever C, pivoted bar D, dog E, and bar F with the swivel G, hook H, adjustable lever K, set-screws I and J, and spring-catch L, substantially as and for the purposes set forth.

In testimony that I claim the foregoing as my own invention I affix my signature in presence of two witnesses.

CHARLES J. LEACH.

Witnesses:
  HORACE B. CLOVER,
  MARY B. CLOVER.